United States Patent [19]

Strasser et al.

[11] Patent Number: 5,363,226
[45] Date of Patent: Nov. 8, 1994

[54] APPARATUS AND METHOD FOR DISPERSION COMPENSATION FOR A GRATING COUPLER USING A SURFACE RELIEF REFLECTION GRATING

[75] Inventors: Thomas A. Strasser, Ithaca; Mool C. Gupta, Webster, both of N.Y.

[73] Assignee: Eastman Kodak Company, Rochester, N.Y.

[21] Appl. No.: 118,170

[22] Filed: Aug. 2, 1993

Related U.S. Application Data

[63] Continuation of Ser. No. 863,915, Apr. 6, 1992, abandoned.

[51] Int. Cl.$^5$ .......................... G02B 6/34; G02B 27/44
[52] U.S. Cl. ................... 359/566; 359/569; 385/37
[58] Field of Search .............. 359/566, 569, 615; 372/102; 385/37

[56] References Cited

U.S. PATENT DOCUMENTS

| | | | |
|---|---|---|---|
| 5,089,903 | 2/1992 | Kuwayama et al. | 359/569 |
| 5,101,458 | 3/1992 | Spaulding et al. | 385/37 |
| 5,105,403 | 4/1992 | Kando et al. | 385/37 |

Primary Examiner—Martin Lerner
Attorney, Agent, or Firm—Raymond L. Owens

[57] ABSTRACT

A surface relief reflection diffraction grating is used as a wavelength compensating element for a diffraction grating coupler. The changes in wavelength are compensated for by adjusting the parameters of the reflection diffraction grating so that the dispersion of the reflection diffraction grating is generally equal and opposite to the dispersion of the diffraction grating coupler. The technique has been shown to permit the range of wavelengths which can coupled with the diffraction grating coupler to be extended from 0.7 nm to 17 nm. The lateral shift has an important contribution and can be limiting factor in wavelength compensation.

8 Claims, 14 Drawing Sheets

APPARATUS AND METHOD FOR DISPERSION COMPENSATION FOR A GRATING COUPLER USING A SURFACE RELIEF REFLECTION GRATING

This is a continuation of application Ser. No. 07/863,915, filed Apr. 6, 1992, now abandoned.

BACKGROUND OF THE INVENTION

1. Field of Invention

This invention relates generally to optical information storage and retrieval systems and, more particularly, to the read/write heads of the optical information storage and retrieval systems. The read/write head generates and receives the optical beam which interacts with the storage medium.

2. Description of the Related Art

The use of diffraction grating couplers in the read/write heads of optical information storage and retrieval systems can provide distinct advantages over similar apparatus used in the prior art. The advantages of the diffraction gratings include such features as reduced weight and a compatibility with integrated optical systems. However, the diffraction grating couplers have a wavelength dependence which can compromise the coupling efficiency. In optical storage and retrieval systems, the radiation is typically furnished by a semiconductor laser diode. Semiconductor laser diodes exhibit shifts in operating wavelength which are a function of temperature and power level.

In the past, two approaches for minimizing the effects of changes in the semiconductor diode operating wavelength have been employed. In the first approach, an attempt Was been made to improve the wavelength stability of laser diodes without expensive (and bulky) temperature control circuits. As a result of this effort, distributed feedback lasers have been developed which exhibit wavelength shifts of less than 3 nanometers (nm) over normal operating temperature ranges (i.e., 20° C. to 60° C.). In the second approach, the optical system is designed to include a wavelength shift compensation mechanism. Typically, the compensation mechanism has involved matching the dispersion of another optical element, such as a surface relief grating or volume hologram, with the dispersion of an integrated optic grating coupler.

Recently, it has been shown that a surface relief transmission grating can theoretically be used to achromatize a grating coupler over a 10 nm wavelength range, while a hybrid prism/grating coupler (i.e., a grating fabricated on a prism surface) can compensate for wavelength shifts in the range of over 200 nm. However, the surface relief transmission grating has an unblazed efficiency of less than 50%. The use of the hybrid prism grating coupler has the disadvantage of the bulk and the difficulty in retaining contact to the waveguide in the optical head. The transmission grating achromization approach is most practical when the output grating coupler configuration is considered. For the input radiation beam coupling, the resulting compensation will be over a shorter wavelength. The shorter wavelength coupling range is the result of a shift of the diffracted beam on the grating coupler. The beam shift will effect the coupling efficiency.

The grating coupler should be designed with a reasonable and uniform coupling efficiency. For traditional waveguide couplers, the maximum coupling efficiency is 80% for an incident Gaussian beach. As a practical consideration, a 50% coupling efficiency is considered good. It is therefore desirable that, in view of the losses in the grating coupler, the compensating apparatus be as efficient as possible.

Because of their high efficiency, transmission volume holograms have been considered as compensating elements. However, over wide wavelength ranges (>10 nm), the efficiency of the transmission volume holograms can have unacceptable variation. In addition, the high efficiency occurs near the Bragg angle. This feature eliminates the freedom to tilt a compensation grating, a degree of freedom that can be used in adjustments.

SUMMARY OF THE INVENTION

The present invention is directed to overcoming one or more of the problems set forth above. Briefly summarized, according to one aspect of the present invention, a surface relief reflection diffraction grating is used to provide wavelength shift compensation. The properties of the surface relief reflection diffraction grating are selected to compensate for the wavelength dependence of the grating coupler. In this manner, the full width at half maximum amplitude can be extended from 0.7 nm to 17 nm. The (in-)coupling efficiency is also strongly dependent on the lateral shift indicating that the compensating grating and the coupling grating should be positioned in close proximity. The surface relief grating has a high efficiency making it particularly well suited as a compensation element.

These and other aspects, objects, features and advantages of the present invention will be more clearly understood and appreciated from a review of the following detailed description of the preferred embodiments and appended claims, and by reference to the accompanying drawings.

DESCRIPTION OF THE PREFERRED EMBODIMENTS

1. Detailed Description of the Figures

Figure 1:
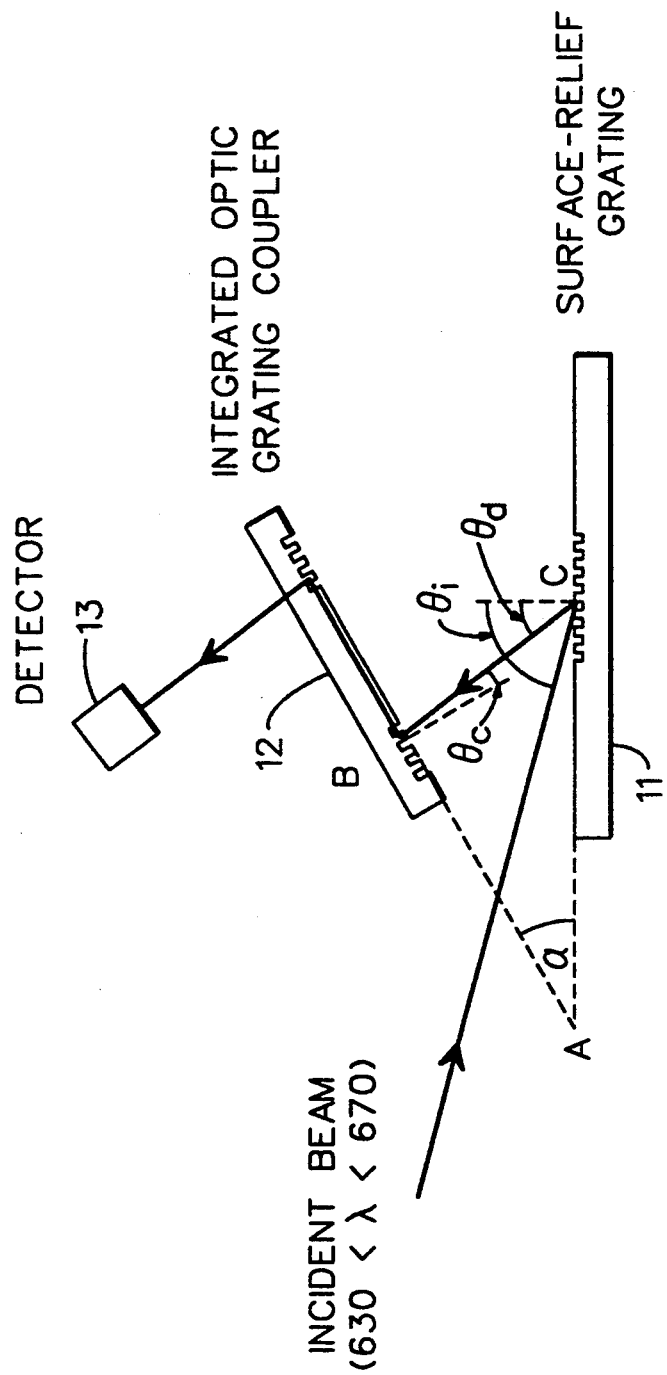
FIG. 1 is a block diagram of the placement of the radiation source, the grating coupler and the compensating surface relief reflection grating according to the present invention.

Referring to FIG. 1, a block diagram of the configuration for compensation of the radiation wavelength dispersion of an optical coupler with a surface relief reflection grating is shown. The incident beam impinges upon the surface relief grating 11 at an angle $\theta_i$ from the perpendicular to the surface of grating 11. The impinging radiation is reflected from the surface relief grating 11 at an angle $\theta_d$ from the perpendicular to the surface of grating 11. The reflected radiation impinges on grating coupler 12 at an angle $\theta_c$ with respect to the surface of grating coupler 12. The radiation coupled into grating coupler 12 is applied to a radiation detector 13. The surface of surface relief grating 11 and the surface of grating coupler 12 have an angle a therebetween.

The coupling condition for a traditional waveguide grating is found by matching propagation vectors in the plane of the waveguide.

$$K_{inc} = mK_{grating} + \beta_{waveguide} \quad (1)$$

where $K_{inc}$ is the component of the incident wave vector in the waveguiding plane;

$K_{grating}$ is the grating vector $2\pi/d_{IO}$ m is the order of the diffraction;

$\beta_{waveguide}$ is the propagation vector of the guided mode being considered; and $d_{IO}$ is the period of the integrated optic coupling grating.

This equation can be simplified to $$n_c k_o \sin(\theta_c) = m2\pi/d_{IO} + \beta_{waveguide} \quad (2)$$

where $k_o$ is the vacuum waveguiding vector ($2\pi/\lambda$);

$n_c$ is the index of refraction of the cover medium; and $\theta_c$ is the incidence angle in the medium of index $n_c$.

If only the more efficient first-order coupling is considered and air is taken as the cover medium, then Equation 2 reduces to $$\sin(\theta_c) = n_{eff} - \lambda/d_{IO} \quad (3)$$

The relationship in Equation 3 can be differentiated and rearranged to determine the angular dispersion of the grating coupler condition. The resulting equation is $$d\theta_c/d\lambda = [dn_{eff}/d\lambda - 1/d_{IO}]/\cos(\theta_c) \quad (4)$$

This result shows how the incident angle must be varied with wavelength to maintain optimum coupling. Experimental results indicate that the waveguide dispersion $(dn_{eff}/d\lambda)$ is a significant term. This term is effected by the waveguide material dispersion and the substrate material dispersion as well as the waveguide structure dispersion (i.e., how $n_{eff}$ changes with wavelength). To estimate values of $n_{eff}$, the specific materials from which waveguides are constructed must be considered. Referring to Table 1, the refractive indices are tabulated at 651 nm and 589 nm. Using these index values, the $n_{eff}$ values for a film (waveguide) thickness of 0.5 μm are given.

TABLE 1

| λ | $n_{sub}$ (quartz) | $n_{film}$ (polystyrene) | $n_{eff}$ |
|---|---|---|---|
| 589 nm | 1.4584 | 1.590 | 1.535 |
| 651 nm | 1.4565 | 1.584 | 1.526 |

Figure 2:
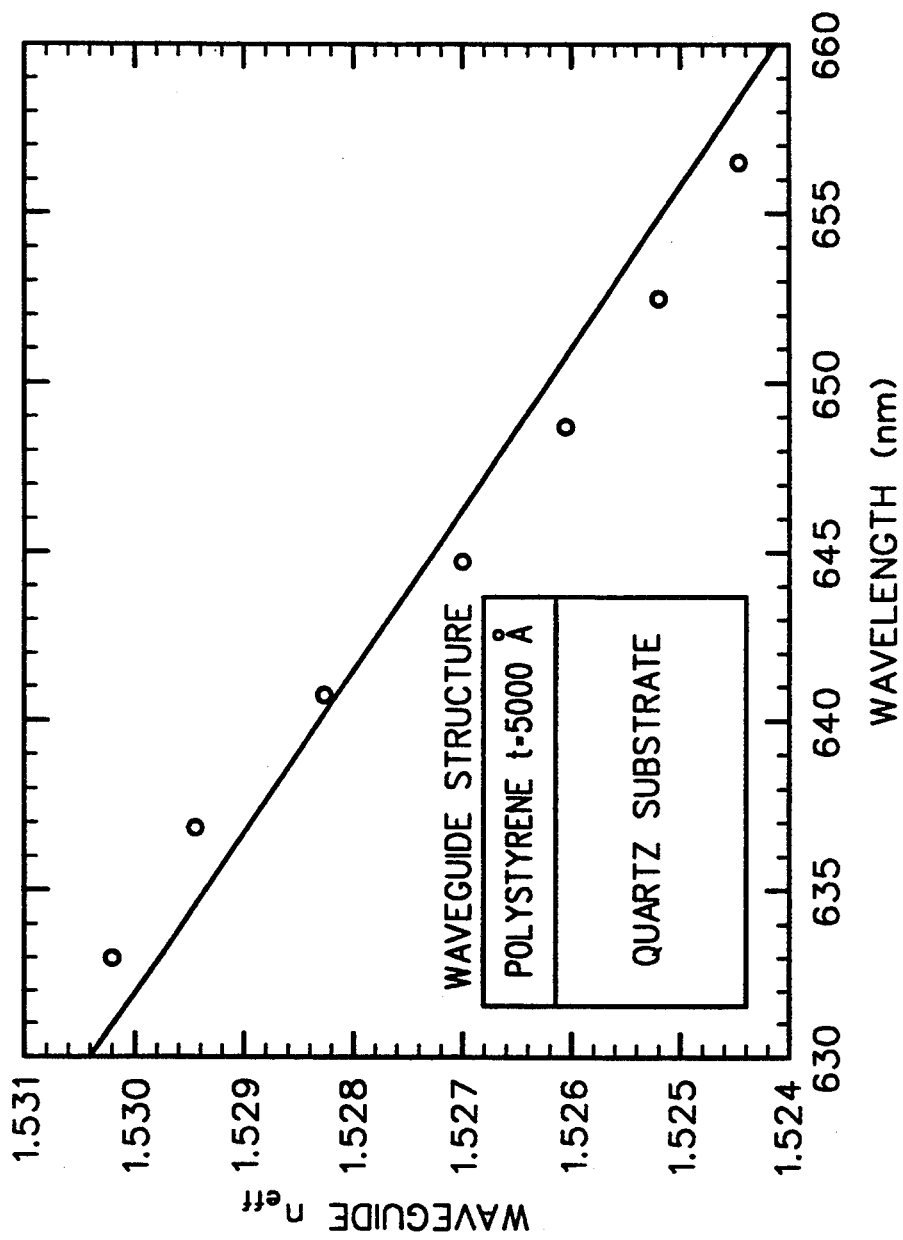
FIG. 2 is a plot of the index of refraction, $n_{eff}$, as a function of wavelength for an optical waveguide.

Between these wavelengths, the measured dispersion of $n_{eff}$ is consistent with a linear fit (cf. FIG. 2). This linear dispersion dependence was used in Equation 4 to estimate the total angular dependence of the integrated optic grating. The dispersion of a surface relief grating can be found in a manner similar to the one used above. Starting with the general diffraction grating equation $$\sin(\theta_i) + \sin(\theta_d) = m\lambda/d_{SR} \quad (5)$$

where $\theta_i$ is the angle of incidence on the grating;

$\theta_d$ is the angle of the diffraction grating, and $d_{SR}$ is the period of the surface relief grating. Any order (m) of the grating can be chosen. However, in order to maintain high efficiency the grating should be blazed specifically for the wavelength and order being used. To simplify the calculations and fabrication, first-order unblazed gratings are used. With $\theta_i$ and $d_{SR}$ taken as constants and the first-order diffraction assumed, Equation 5 can be differentiated and rearranged to provide the diffraction angular dispersion of a surface relief grating at an angle of incidence $$d\theta_d/d\lambda = 1/d_{SR}\cos(\theta_d) \quad (6)$$

Figure 3:
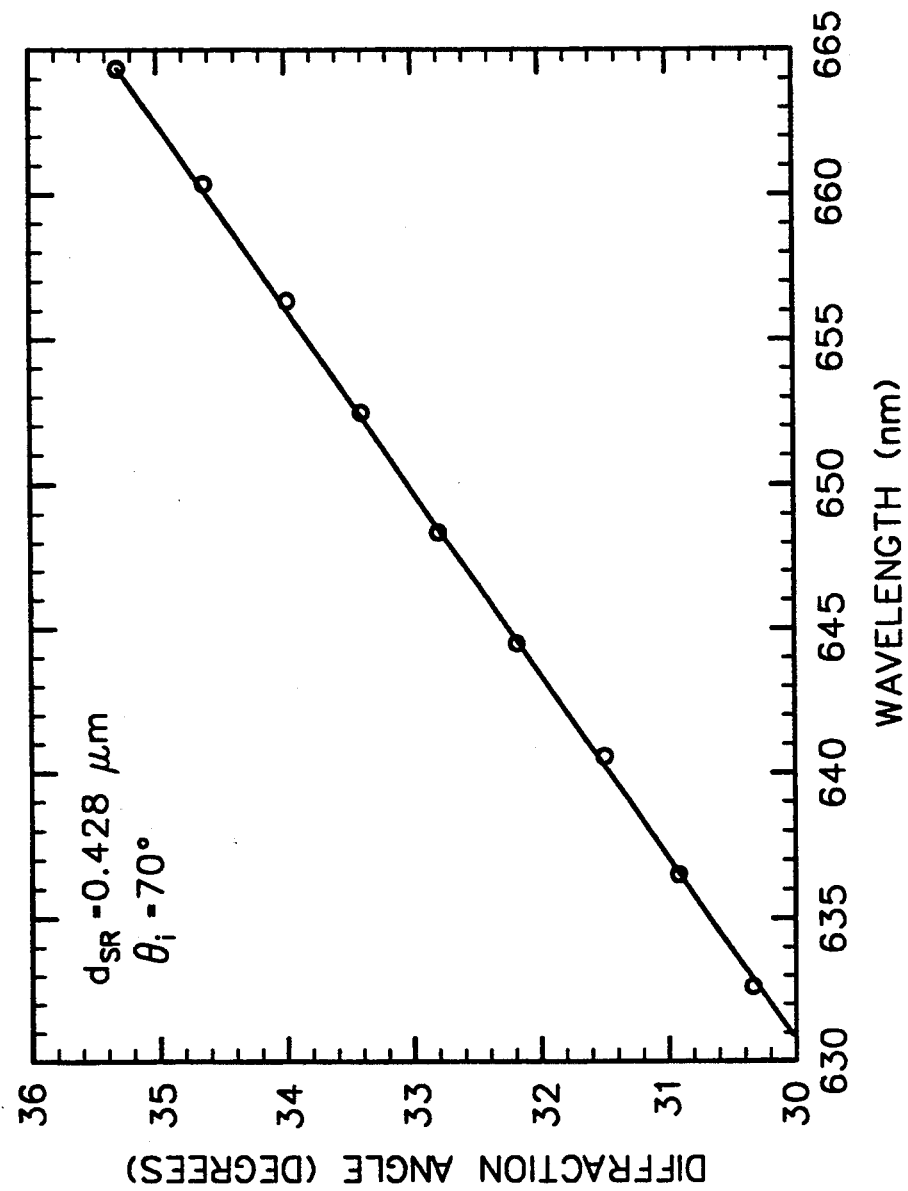
FIG. 3 is an experimentally determined plot of the diffraction angle as a function of wavelength.

Referring to FIG. 3, an experimentally derived plot of the diffraction angle as a function of wavelength for a surface relief diffraction is shown. The plot verifies the relationship in Equation 6.

Equal and opposite angular changes as function of wavelength are required for the coupling grating and for the diffraction grating for the required angular compensation. The dispersion matching condition is given by $$d\theta_c/d\lambda = -d\theta_d/d\lambda \quad (7)$$

or substituting from Equations 4 and 6, $$-1/d_{SR}\cos(\theta_d) = [dn_{eff}/d\lambda - 1/d_{IO}]/\cos(\theta_c) \quad (8)$$

The solution to this problem is made difficult by the inter-dependence of the terms. From Equation 3, $\theta_c$ is a function of $d_{IO}$, while Equation 5 indicates that $\theta_d$ is a function of $d_{SR}$. As compared to diffraction grating couplers, the surface relief gratings are relatively easy to fabricate. Therefore, the parameters of the surface relief grating couplers can be varied to optimize the dispersion compensation.

Equation 8 is not a sufficient condition to insure that input coupling will occur. The surface relief grating must be oriented at an angle to the integrated optic grating that allows the diffracted beam from the surface relief grating to be incident on the coupler at the exact coupling angle. Additionally, the angular relationships must be carefully determined to ascertain that the angular dispersions actually compensate rather than compound the dependence on wavelength changes. This compensation can be verified by noting that since the coupling dispersion is negative (cf. Equation 4), as the wavelength is increased, the coupling angle will decrease. Alternatively, since the dispersion of the relief grating is positive (cf. Equation 6), the diffraction angle increases with increasing wavelength. The arrangement shown in FIG. 1 thereby fits the criteria for compensation because, as the wavelength increases, the beam diffracted by the surface relief grating moves away from the grating normal, thereby making it incident on the coupler grating at an angle greater, but more negative, than the original coupling angle. From FIG. 1, the optimum tilt angle $\alpha$ can be determined from $\theta_c$ and $\theta_d$ by the geometry of the triangle identified by the intersection of the projected surfaces of the coupling grating, the grating of the surface relief grating and the grating of the coupling grating receiving radiation. The optimum value of $\alpha$ is given by, $$\alpha_{opt}(\lambda) = \theta_c(\lambda) + \theta_d(\lambda) \tag{9}$$

Although both $\theta_d$ and $\theta_c$ are functions of wavelength, ideal dispersion compensation provides that $\alpha_{opt}$ will be a constant as a function of wavelength. Consequently, a way to compare the dispersion matches of different gratings is to look at plots of $\alpha_{opt}$ as function of wavelength (cf. FIG. 2). Since the optimum condition is to have alpha a constant, it follows that the condition is $$d\alpha_{opt}/d\lambda = 0 \tag{10}$$

over as large a wavelength range as possible.

Figure 4:
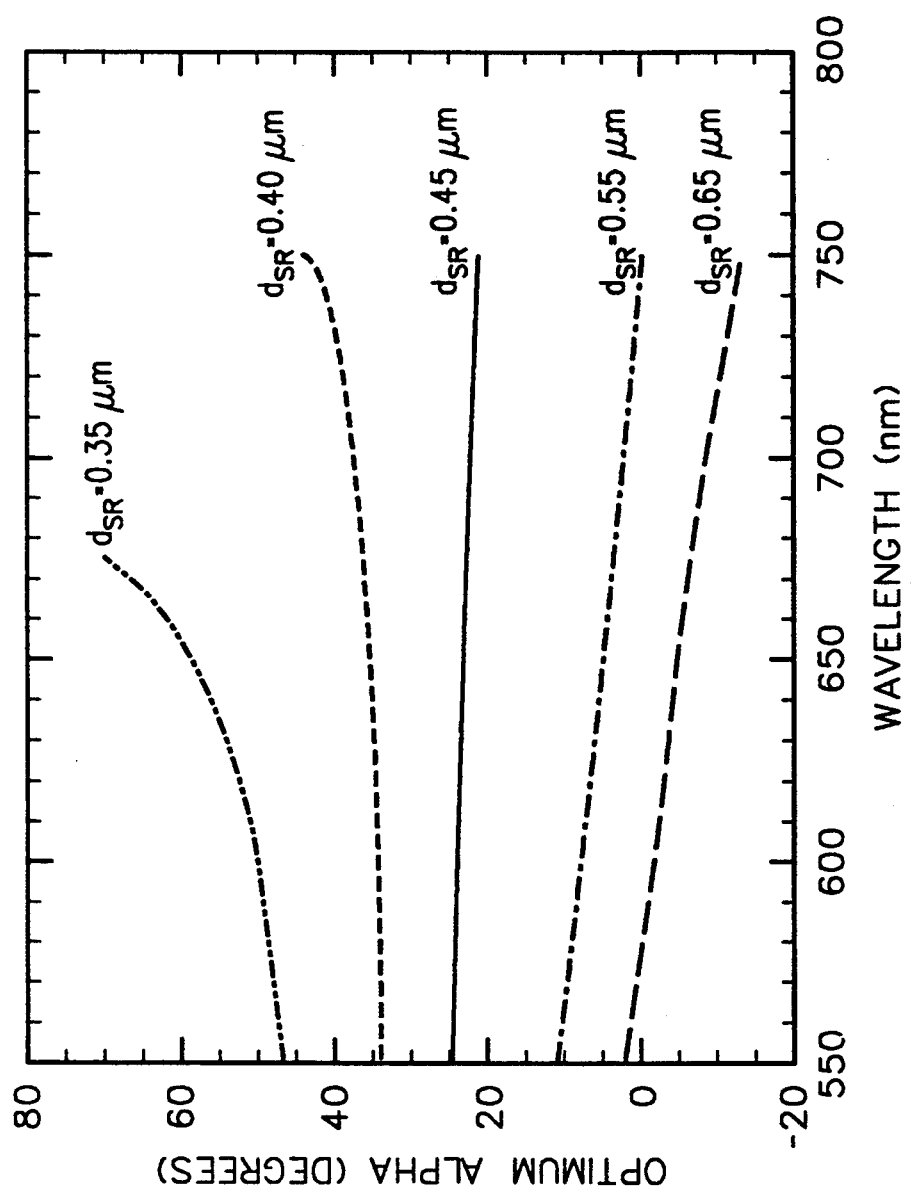
FIG. 4 is a plot of the optimum angle ($\alpha$) between the reflection diffraction grating and the grating coupler as a function of wavelength for several reflection grating periods.
Figure 5:
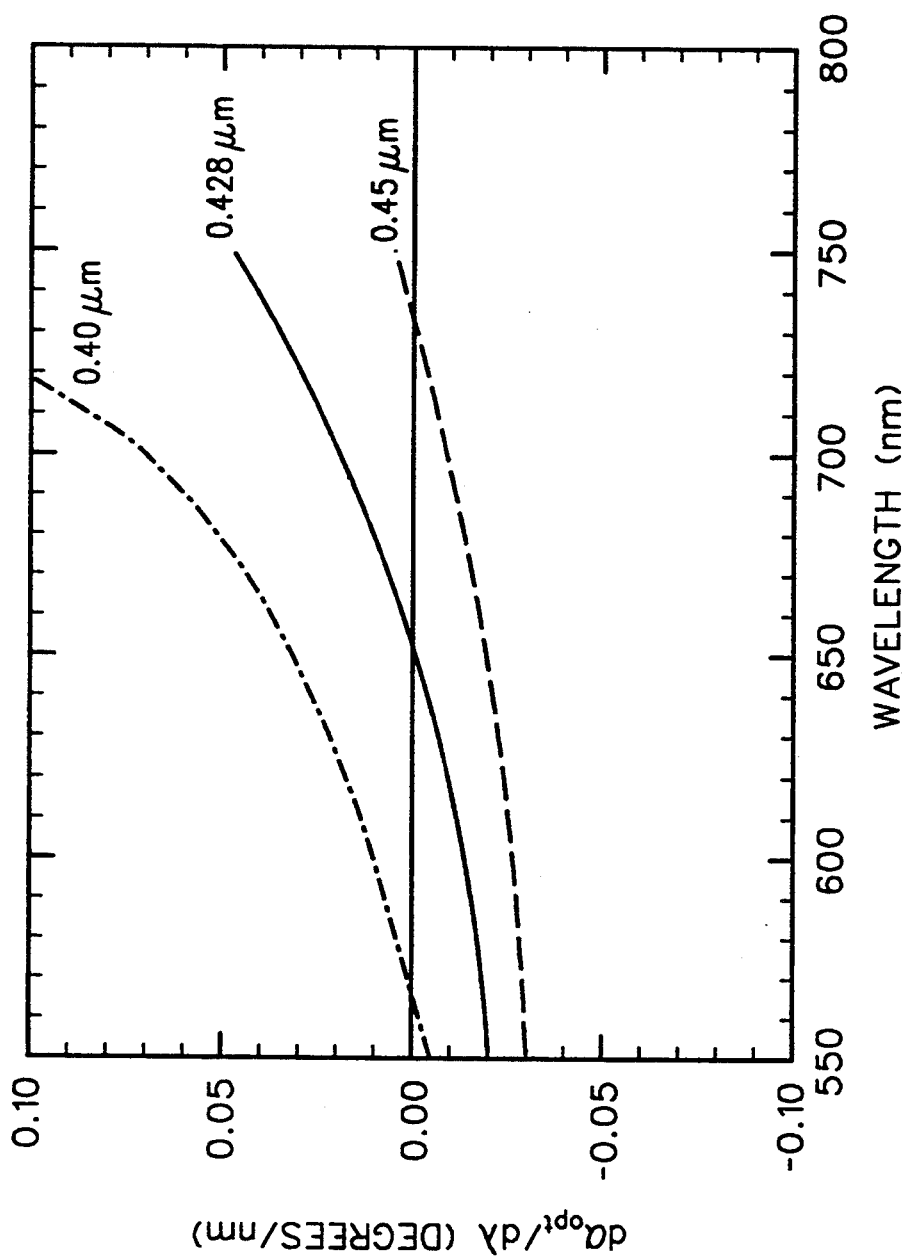
FIG. 5 is a plot of the change with wavelength of optimum angle ($\alpha$) between the reflection diffraction grating and the grating coupler as a function of wavelength.
Figure 6:
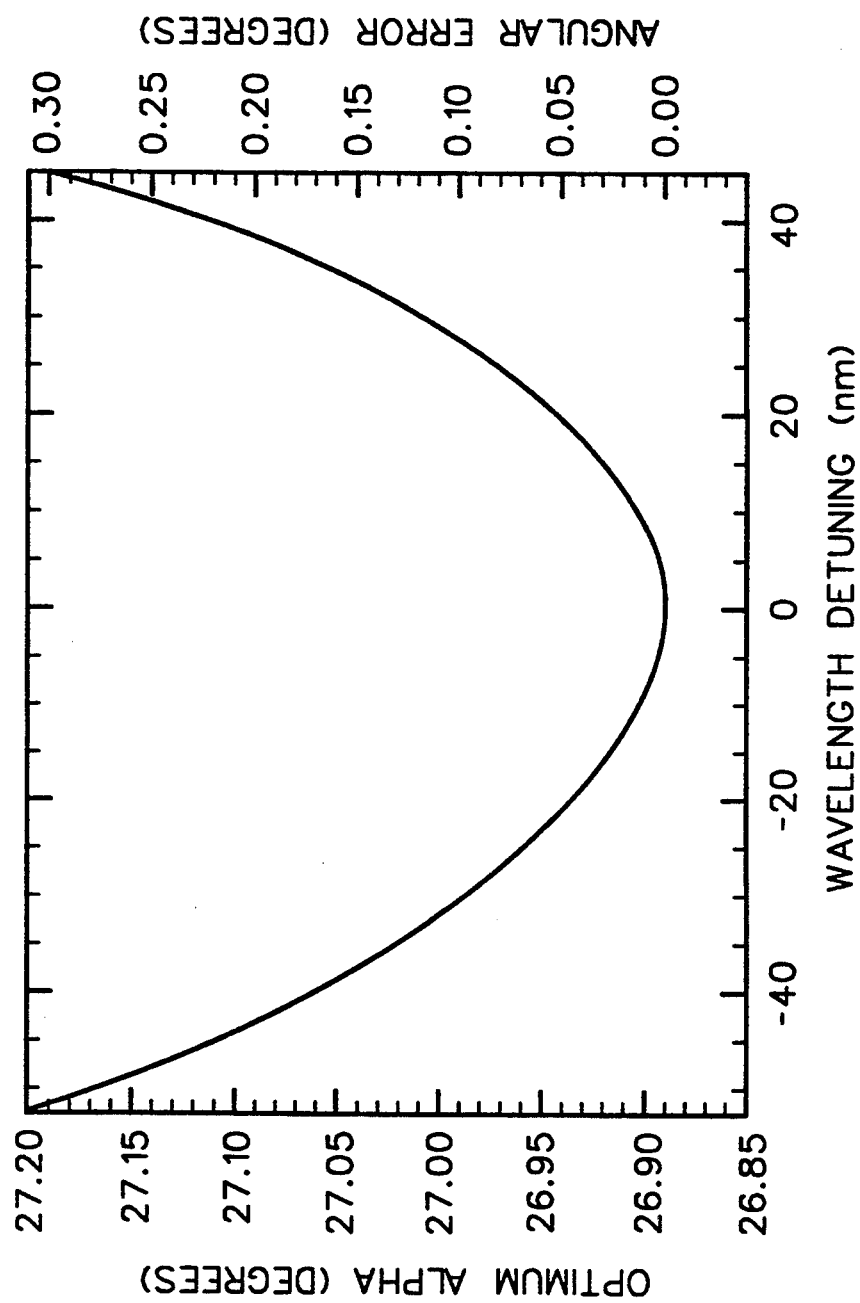
FIG. 6 is a plot of the optimum angle ($\alpha$) between the reflection diffraction grating and the coupling grating as a function of wavelength detuning.

The dispersion matching calculations are graphically illustrated in FIGS. 4–6. The integrated optical grating parameters as well as the angle of incidence are taken to be constant at the experimental values ($\theta_i = 70°$, $d_{10} = 0.388$ μm, $n_{eff} = 1.53$ at 632.8 nm). The $\alpha_{opt}$ can then be plotted as a function of wavelength for different surface relief grating periods (cf. FIG. 4). FIG. 4 shows the optimum period for the grating being considered must be between reflection grating periods $d_{SR}$ of 0.4 μm and 0.45 μm because somewhere in this region the slope of the $\alpha_{opt}$ curve changes from negative to positive. Equation 8 illustrates that the optimum dispersion matching occurs when the compensating grating period is 0.428 μm. To illustrate that this compensation is optimum for the waveguide, the dispersion of the $\alpha_{opt}$ (i.e., the slope of FIG. 4) was then plotted as a function of wavelength in FIG. 5. The 0.428 μm period surface relief grating possesses a minimum ($d\alpha/d\lambda = 0$) in the experimental wavelength range of interest (630 nm $< \lambda <$ 670 nm). In FIG. 6, an expanded plot of $\alpha_{opt}$ as a function of wavelength in the region where $d\alpha_{opt}/d\lambda$ is zero, reveals the compensation that is possible over a small wavelength change, depending on the angular sensitivity of the grating coupler.

The dispersion of $\alpha_{opt}$ at the center wavelength is strongly dependent on the period of the grating. The dependence is strong and the reduction of the FWHM (Full Width at Half Maximum) of the compensation range by 50% occurs with deviations of nanometers from the optimum surface relief period. This result in,plies that attaining the precise period of the surface relief grating is a crucial step in obtaining optimum compensation for a grating coupler. These effects overwhelm the effect of varying the angle of incidence. The dependence of the compensation on the incidence angle is negligible compared to fabricating a grating of exactly the optimum period. This dependence is the reason that the angle of incidence is taken at the experimentally convenient angle of 70°.

For simplicity of discussion, a new parameter is defined, the angular error of the coupling system at a given wavelength. The angular error of the coupling system is defined as the difference between the optimum angle $\alpha$ and the fixed angle alpha at which the system is set up. This error does not effect the incidence angle on the surface relief grating, or the diffracted angle [$\theta_d$ is determined by Equation 5]. The angular error term is therefore the same as the difference between the optimum coupling angle ($\theta_c$) at a given wavelength, and the actual angle of incidence ($\theta'_c$) on the grating coupler for that wavelength. From the geometry the angular error can be defined as $$\angle E(\lambda) = \alpha_{opt}(\lambda) - \alpha = \theta_c(\theta) - \theta'_c(\lambda) \tag{11}$$

where $\alpha$ is the tilt angle in the experimental setup (a constant).

Figure 7:
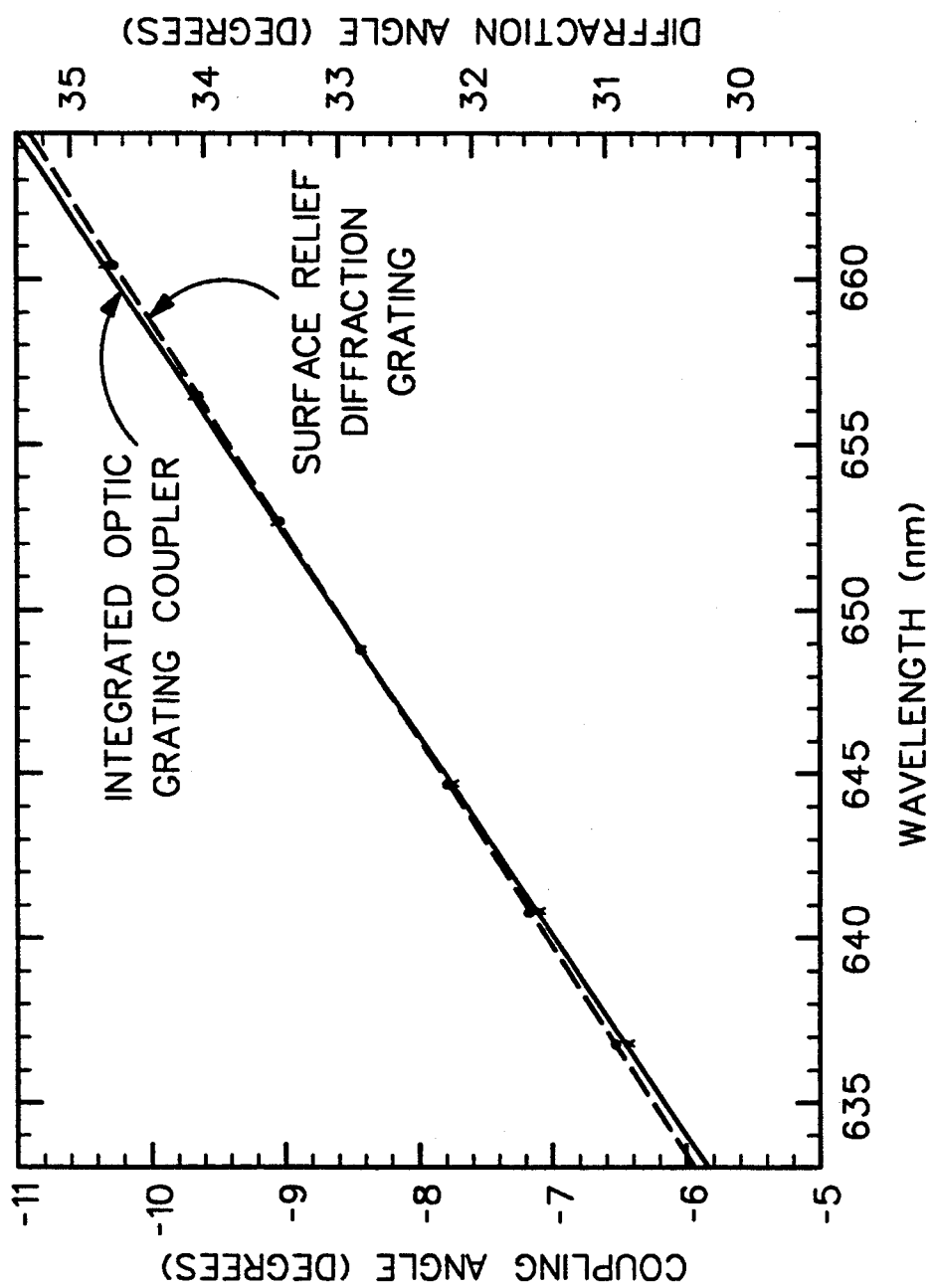
FIG. 7 is a plot of both the coupling angle of grating coupler and the diffraction angle of the surface relief diffraction grating as function of wavelength.

The directional dispersion is not the only source of variation in the coupling efficiency as a function of wavelength. The dispersion matching is illustrated in FIG. 7 where the grating coupling angle and diffraction grating angle are both plotted over the wavelength range considered experimentally (for the experimental setup wherein $d_{SR} = 0.428$ μm and $d_{10} = 0.388$ μm). The importance of this plot is that, to within the typical grating coupling angular acceptance of less than 0.1°, changes in these angles are matched to each other over a 20 nm range. The figure shows that this involves actual angular changes (diffraction angle) of greater than 4°. Considering practical separation distances between the surface relief grating and the grating coupler, the angular swing of 4° is certainly enough to move the beams lateral position through an optimum positioning on the grating coupler. This movement results in additional efficiency loss that was not considered in the previous angular calculations.

Figure 8:
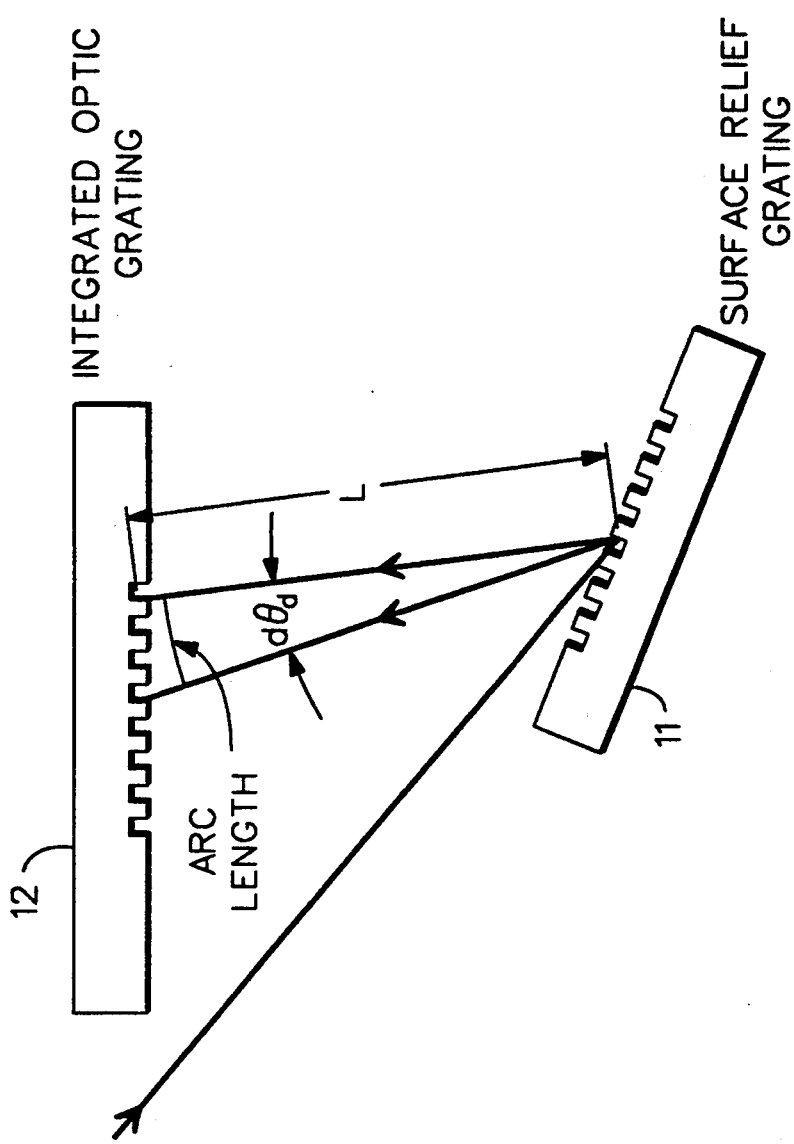
FIG. 8 illustrates the relative geometry of the components in a shift of lateral position.
Figure 9:
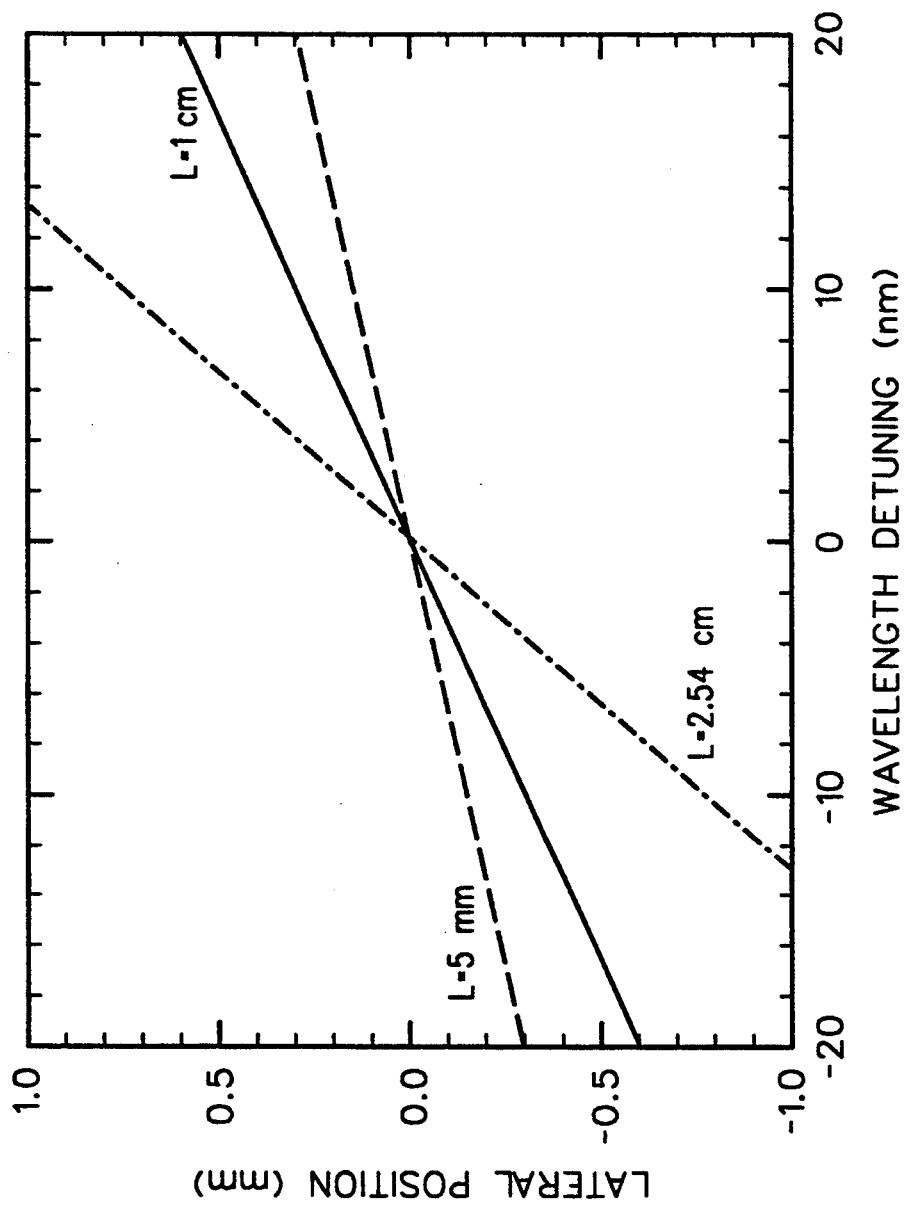
FIG. 9 is a plot of lateral position of the radiation beam as a function of wavelength detuning.

The coupling efficiency as a function of lateral spacing of an integrated optic grating depends on the coupling length of the grating, which in turn depends on the period, profile, $n_{eff}$, wavelength, and defocus of the bee being used. The first step in determining the dependence of coupling efficiency on position is to determine the total position shift that may occur. In FIG. 8, the geometry of the change in lateral beam position is shown in detail. Since the angular shifts involved are less than 4°, the small angle approximation will be used to determine the arc distance for an angular swing of $d\theta_d$ with a radius L (see FIG. 8). This arc length is given by $$\text{arc length} = Ld\theta_d = L(d\theta_d/d\lambda)d\lambda, \tag{12}$$

where L is the grating separation distance. The arc length can then be converted to lateral position by dividing the cosine of the coupling angle. When the values for $\theta_d$ and $\theta_c$ are taken as those at the center wavelength (652 nm), the lateral position as a function of wavelength detuning is given in FIG. 9 for different L distances. FIG. 9 shows that the experimental L distance of 1 cm the lateral position on the grating change is on the order of 1 mm. Considering that the typical high efficiency gratings achieve their maximum efficiency with beam sizes on the order of a millimeter, these calculations indicate that the lateral position may certainly affect the coupling efficiency of the compensated system. For this reason, in verification experiments, the L distance was reduced to slightly less than 1 cm. The grating separation distance could easily be reduced to 5 mm; however, the geometry of the sample used in our experiments did not permit this separation.

2. Operation of the Preferred Embodiment

It will be appreciated that there has been presented calculations of the angular matching and positional error conditions.

Figure 10:
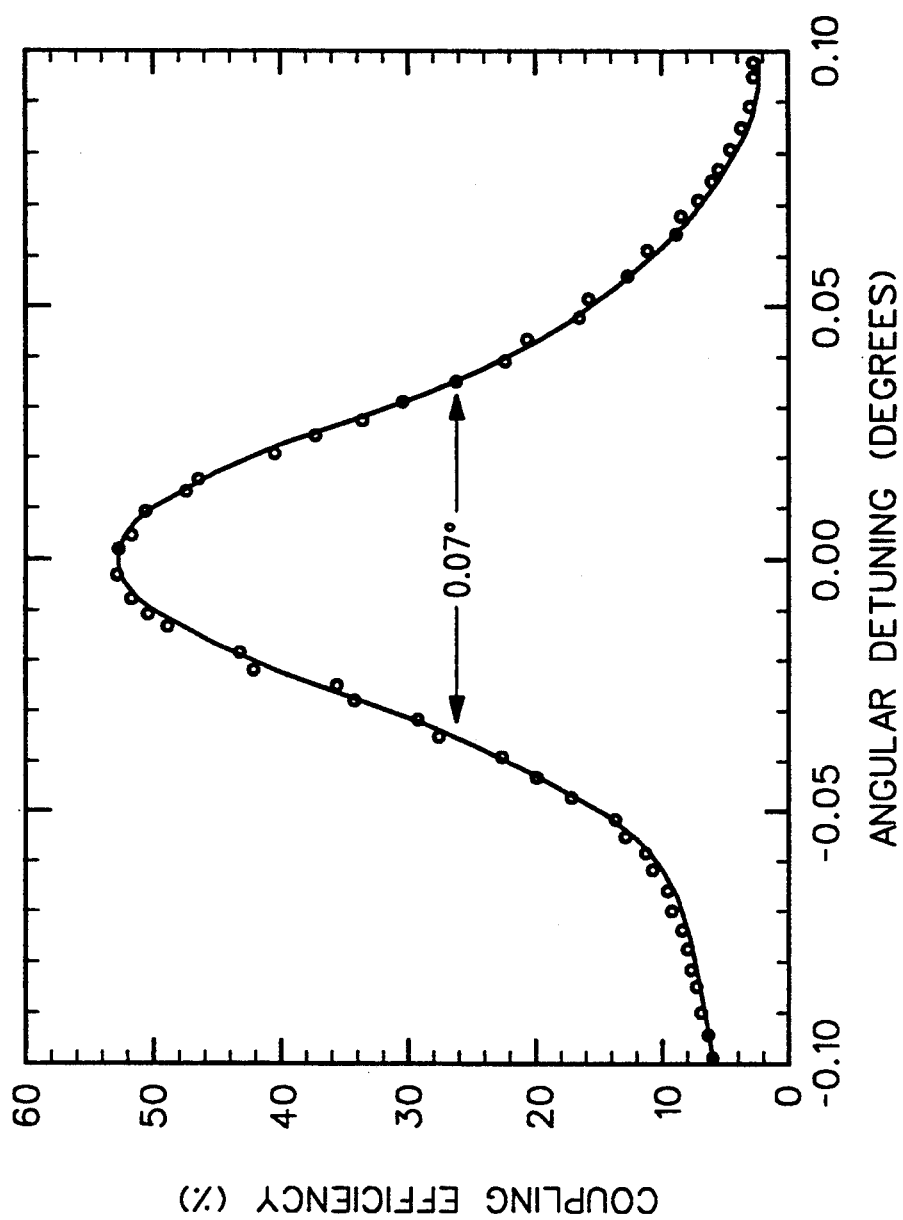
FIG. 10 is a plot of coupling efficiency as a function of angular detuning.

Referring first to the angular error, the efficiency as a function of wavelength for only angular dispersion has been calculated. The fit shown on the relative efficiency plot (i.e., FIG. 10) was taken to give the coupling efficiency as a function of angular error. This function is used to convert the angular error, shown in FIG. 6, to coupling efficiency, with the a taken to be the minimum of the $a_{opt}$ wavelength plot, in order to maintain optimum efficiency. The result shows, in FIG. 11, the relative coupling efficiency due to angular error as a function of wavelength change. The plot in FIG. 11 should be compared with the plot in FIG. 12, the measured relative coupling efficiency as a function of wavelength detuning. The coupling FWHM of 33 nm includes a broad peak region, greater than 10 nm in extent, where there is effectively no coupling efficiency change. It should be noted that the above conversion technique assumes the efficiency as a function of angular error dependence for the coupler grating to be constant over the small wavelength changes being considered (40 nm in total). This should be a good assumption because one would expect little change in the FWHM over 20 nm wavelength change.

Figure 11:
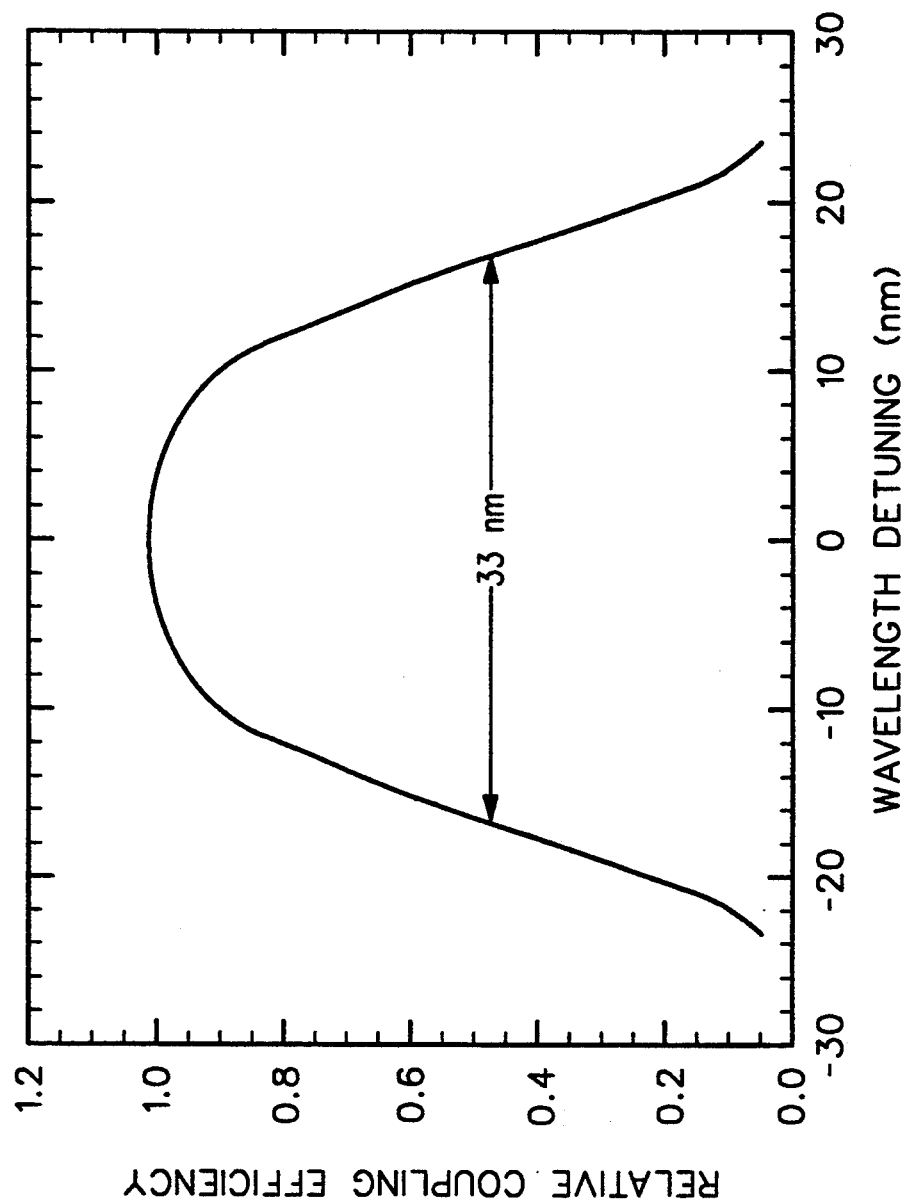
FIG. 11 is a plot of the relative coupling efficiency as a function of wavelength detuning.
Figure 12:
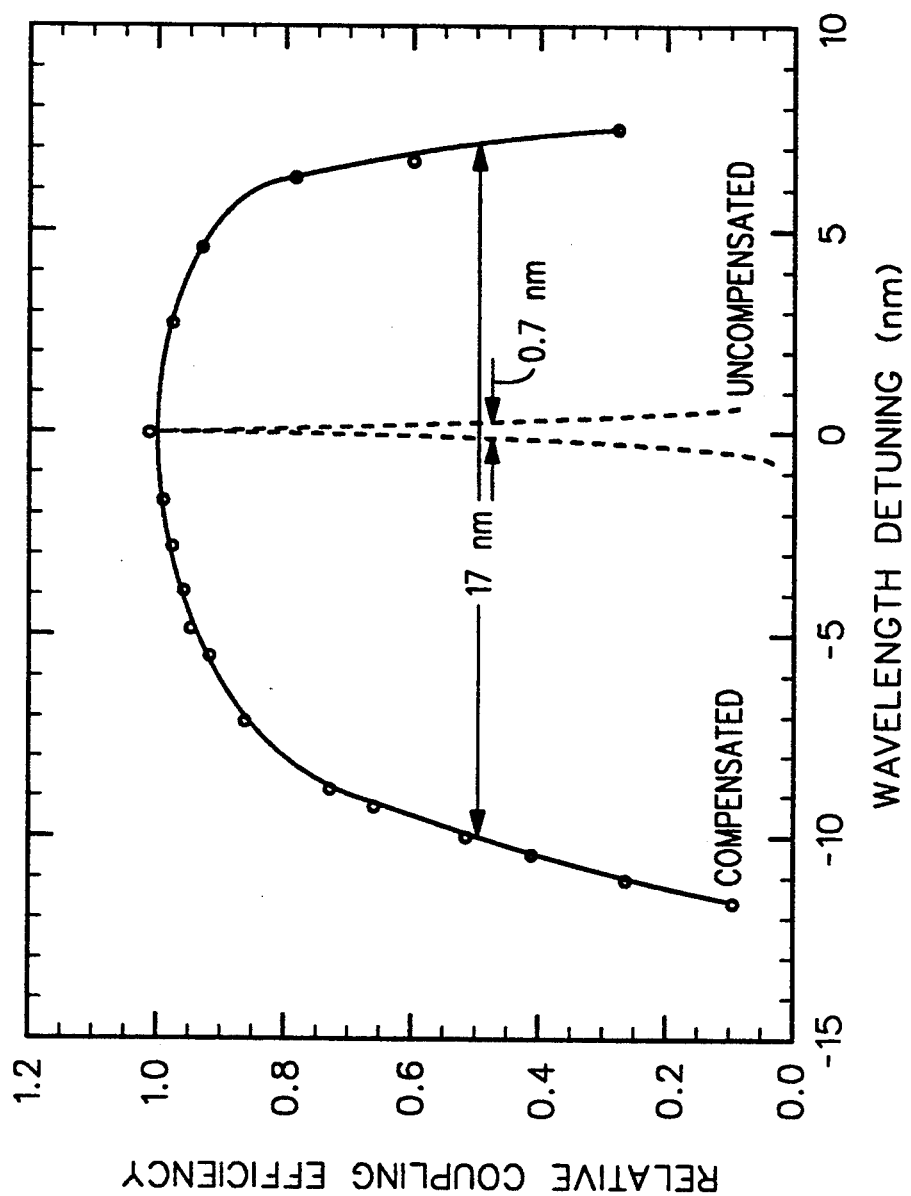
FIG. 12 is a plot of the measured relative coupling efficiency as a function of wavelength detuning.

Although the data plotted in FIG. 11 does not include lateral shift on input coupling, it should be perfectly appropriate for applications that deal only with output coupling. The reason is that there is no positional dependence for diffraction of a uniform reflection grating. Therefore, an out-coupled beam will couple from a film at different angles for different wavelengths, but this will only cause a shift on the position of the diffraction grating. The beam will then be diffracted in the same direction as any other wavelength beam. However, FIG. 8 illustrates that the position will change with wavelength. For applications in need of tight positional as well as angular compensation, positional error must be considered even though the out-coupled efficiency is not affected.

Figure 13:
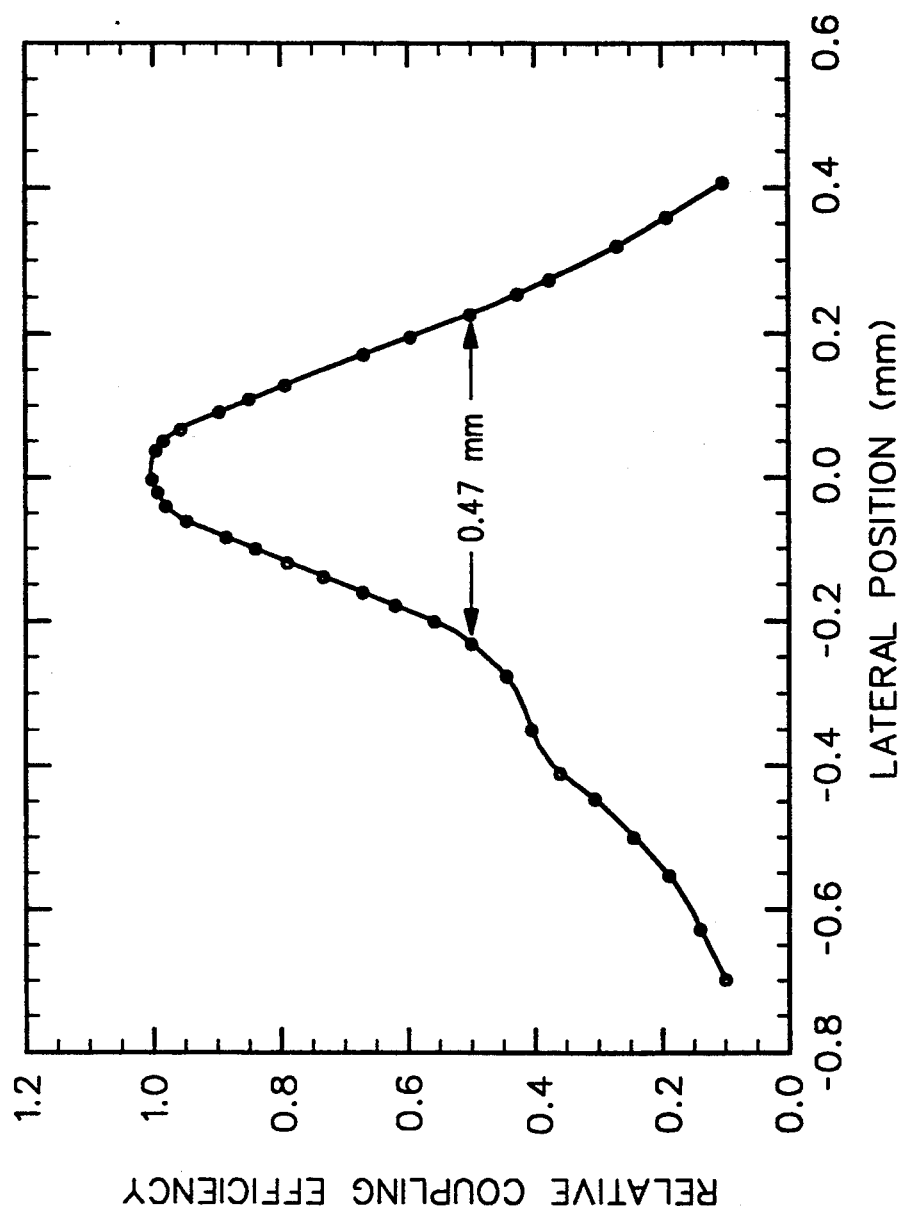
FIG. 13 is a plot of the relative coupling efficiency as a function of lateral position.
Figure 14:
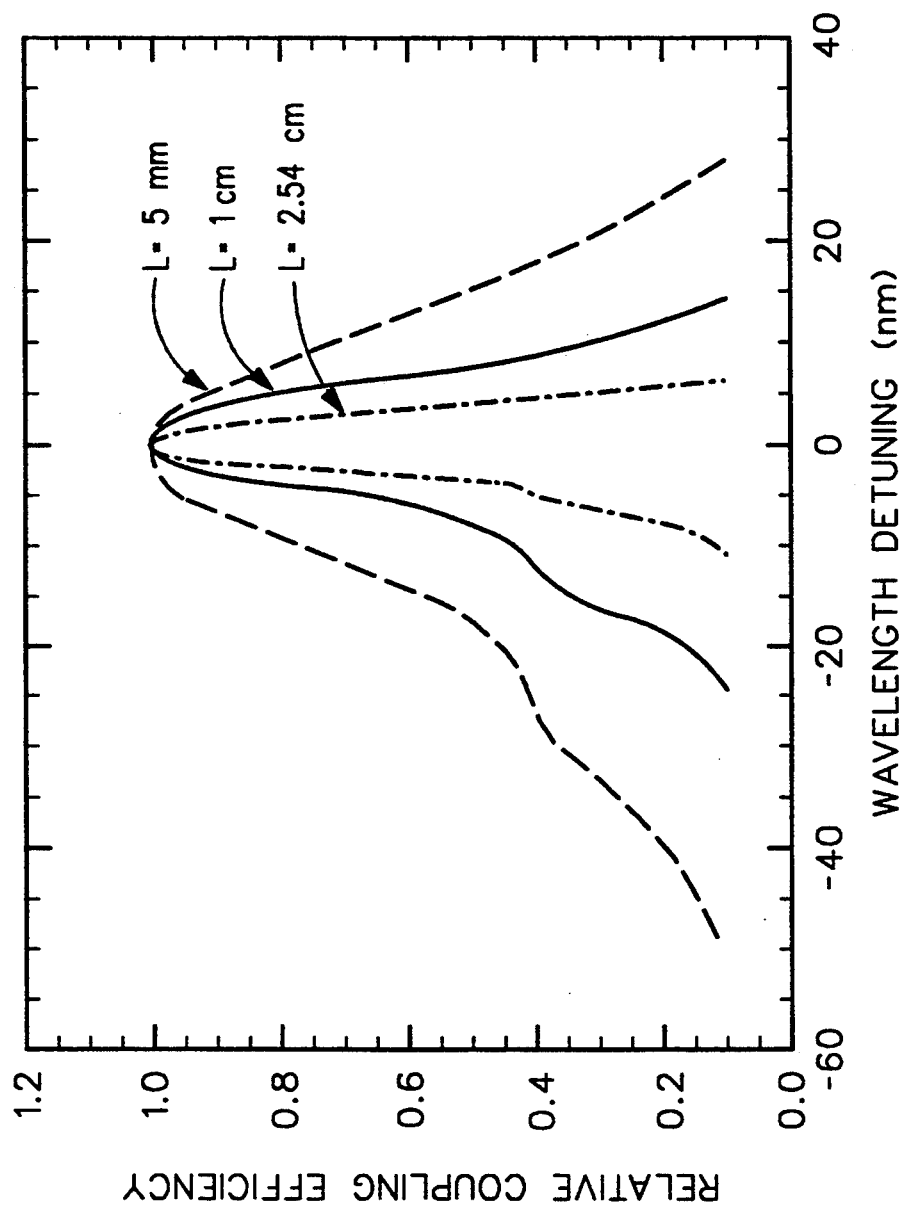
FIG. 14 is a plot of relative coupling efficiency as a function of wavelength detuning for a plurality of distances between the reflection grating and the grating of the grating coupler.

The beams lateral shift (FIG. 9) at the input grating will have a direct effect on the efficiency of the coupling as a function of wavelength. The additional information needed to determine this effect is the efficiency as a function of the lateral position for the grating being used (cf. FIG. 13). The peak efficiency region is strongly dependent on the lateral position, with a FWHM efficiency dependence of only 0.47 mm. When the lateral shift efficiency dependence is taken to be the same over the wavelength range of interest, the results in FIG. 9 can be combined with the efficiency curve of FIG. 13 to give the relative efficiency as a function of wavelength for in-coupling errors due to lateral beam shift. The position dependence (FWHM=22 nm for L=5 mm, cf. FIG. 14) in this case turns out to be the limiting factor rather than the angular dependence (FWHM=33 nm), which is all that has been considered in the prior art.

Operation of the present invention is believed to be apparent from the foregoing description and drawings, but a few words will be added for emphasis. The reflection grating has been shown to be a suitable optical element to compensate for coupling efficiency change due to diode laser wavelength shift. The use of the reflection relief grating was found to have a higher efficiency than a transmission grating, and with an additional tilt positioning degree of freedom not allowed by Bragg diffraction in a transmission volume holograms (HOE).

The waveguide dispersion was measured and found to be a contributing term in the dispersion matching equation and should be considered to obtain optimum compensation. Lateral beam shift is also an important parameter in the design of a compensating input coupling grating. Experiments indicate that the lateral beam shift was the limiting factor in the compensation. The angular dispersion matching is a secondary limitation. Previously proposed compensation systems have a beam shift either on the in-coupled or out-coupled bee and this shift must be considered to determine whether compensation can be implemented within the design criterion. The experimental fabrication of surface relief and coupler gratings that precisely matched each other was the limiting step. Precisely matching the periods of the gratings was important to maximize the performance of the system. The ability to provide slight adjustments in the position and angle of each element was also necessary to optimize the system performance.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. An optical coupling system for use in the read/write head of an optical information storage and retrieval system, said optical coupling system providing compensation for changes in radiation wavelength wherein no substantial coupling efficiency change results from said changes in radiation wavelength, said optical coupling system comprising:

a reflection surface diffraction grating having said radiation applied thereto, wherein radiation has an input angle of $\theta_i$ relative to a perpendicular line from a surface of said reflection surface grating, a diffracted radiation component resulting from said radiation having an angle $\theta_d$ with respect to said perpendicular line;

a diffraction grating coupler with a grating coupler surface having an angle a relative to said surface grating surface, wherein said diffraction grating coupler has at least a first grating on said grating coupler surface, said diffraction grating coupler being positioned whereby said first grating receives said diffracted radiation component at an angle $\theta_c$ with respect to a line perpendicular to said grating coupler surface, wherein radiation is introduced into said grating coupler through said first grating, wherein a is the angle between the surface grating surface and the grating coupler surface, said surface grating period being selected whereby $d\theta_d/dl = -d\theta_c/dl$ and whereby a is determined by $da_{opt}/dl = 0$ when l is the wavelength of incident radiation; and wherein said condition, $d\theta_d/dl = -d\theta_c/dl$, is equivalent to $-1/d_{SR}\cos(\theta_d) = [dn_{eff}/dl - 1/d_{IO}]/\cos(\theta_c)$, wherein $d_{SR}$ = the periodicity of the reflection diffraction grating, $d_{IO}$ = the periodicity of the coupling grating, and $n_{eff}$ = effective index of refraction of the grating coupler.

2. The optical coupling system of claim 1 wherein said reflection diffraction grating and a grating of said grating coupler are positioned to limit effects of radiation beam lateral shifts on the radiation beam coupling efficiency.

3. The optical coupling system of claim 1 wherein an optimum value $\alpha_{opt}$ of said angle $\alpha$ is determined when $d\alpha_{opt}/d\lambda = 0$.

4. A method of compensation for changes in the wavelength of a radiation applied to a diffraction grating coupler wherein no substantial coupling efficiency change results from said changes in the wavelength of said radiation, said method comprising the steps of:

determining the dispersion of said diffraction grating coupler at an operating wavelength;

determining an optimum value for an angle a between a surface of said diffraction grating coupler and a surface of a surface relief diffraction grating at said operating wavelength;

fabricating said surface relief diffraction grating, wherein said surface relief grating has an equal and opposite dispersion when said surface relief grating has optimum value for an angle a with respect to said diffraction grating coupler;

positioning said diffraction grating coupler relative to said surface relief grating so that said diffraction grating coupler receives a diffracted radiation from said surface relief diffraction grating on which an incident radiation is applied and so that said surface of said diffraction grating coupler and said surface of said surface relief grating have said optimum angle therebetween;

wherein said determining step includes a step of determining a dispersion relationship for said diffraction grating coupler even by $d\theta_c/dl$, where $\theta_c$ is the angle from the perpendicular from the diffraction grating coupler for radiation coupled to said diffraction grating coupler and l is the wavelength of radiation;

wherein said fabricating step includes a step of determining a dispersion relationship for said surface relief diffraction grating given by $d\theta_d/dl$, where $\theta_d$ is the angle from the perpendicular from said surface relief diffraction grating for radiation coupled to said diffraction grating coupler; and wherein the condition, $d\theta_d/dl = -d\theta_c/dl$, is equivalent to $-1/d_{SR}\cos(\theta_d) = [dn_{eff}/dl - 1/d_{IO}]/\cos(\theta_c)$, wherein $d_{SR}$ = the periodicity of the reflection diffraction grating, $d_{IO}$ = the periodicity of the coupling grating, and $n_{eff}$ = effective index of refraction of the grating coupler.

5. The method of claim 4 further comprising a step of positioning said surface relief grating close to said grating coupler to reduce effects of lateral radiation beam shifts.

6. The compensation method of claim 4 wherein said optimum value of angle $\alpha$, $\alpha_{opt}$ determined by $d\alpha_{opt}/d\lambda$.

7. A radiation coupling system having compensation for changes in wavelength so that no substantial coupling efficiency change occurs in response to said changes in wavelength, said coupling system comprising:

a diffraction grating coupler coupling an intermediate radiation beam having an angle $\theta_c$ with a perpendicular to a plane of a diffraction grating coupler grating to an optical waveguide, said diffraction grating coupler having a dispersion given by $d\theta_c/dl$;

a surface relief diffraction grating which provides said diffraction grating coupler with said intermediate radiation beam, said intermediate radiation beam making an angle $\theta_d$ with a perpendicular to a grating region of said surface relief grating, an incident intermediate radiation beam making an angle $\theta_i$ with said grating region, wherein said surface relief grating is fabricated to have dispersion for said $\theta_i$ and a selected wavelength l of $d\theta_d/dl = -d\theta_c/dl$ and to have an optimum value $a_{opt}$ of angle a between said diffraction grating coupler plane and said grating region of said surface relief grating determined by $da_{opt}/dl = 0$; and wherein said condition, $d\theta_d/dl = -d\theta_c/dl$, is equivalent to $-1/d_{SR}\cos(\theta_d) = [dn_{eff}/dl - 1/d_{IO}]/\cos(\theta_c)$, wherein $d_{SR}$ = the periodicity of the reflection diffraction grating, $d_{IO}$ = the periodicity of the coupling grating, and $n_{eff}$ = effective index of refraction of the grating coupler.

8. The optical coupling system of claim 7 wherein said reflection diffraction grating and a grating of said grating coupler are positioned to limit effects of radiation beam lateral shifts on the radiation beam coupling efficiency.

* * * * *

UNITED STATES PATENT AND TRADEMARK OFFICE
CERTIFICATE OF CORRECTION

PATENT NO. : 5,363,226
DATED : November 8, 1994
INVENTOR(S) : Thomas A. Srasser, et al It is certified that error appears in the above-indentified patent and that said Letters Patent is hereby corrected as shown below:

Claim 1, column 8, line 66, "a" should read -- $\alpha$ --;
Claim 1, column 9, line 7, "a" should read -- $\alpha$ --;
Claim 1, column 9, line 10, "a" should read -- $\alpha$ --;
Claim 1, column 9, line 11, "1" should read -- $\lambda$ --;
Claim 4, column 9, line 34, "a" should read -- $\alpha$ --;
Claim 4, column 10, line 1, "1" should read -- $\lambda$ --;
Claim 4, column 10, line 10, "*Sr*" should read -- SR --;
Claim 7, column 10, line 40, "1" should read -- $\lambda$ --;
Claim 7, column 10, line 42, "a" should read -- $\alpha$ --.

Signed and Sealed this

Nineteenth Day of September, 1995

Attest:

BRUCE LEHMAN

Attesting Officer

Commissioner of Patents and Trademarks